US008849897B2

(12) United States Patent
Ortal et al.

(10) Patent No.: US 8,849,897 B2
(45) Date of Patent: Sep. 30, 2014

(54) DELEGATING APPLICATION INVOCATION BACK TO CLIENT

(75) Inventors: Amos Ortal, Kfar Yona (IL); Nir Nice, Kfar Veradim (IL); Ashwin Palekar, Sammamish, WA (US); Craig Alan Nelson, Issaqua, WA (US); Paresh Ramchandra Haridas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/941,071

(22) Filed: Nov. 15, 2007

(65) Prior Publication Data

US 2009/0132642 A1 May 21, 2009

(51) Int. Cl.
*G06F 15/16* (2006.01)

(52) U.S. Cl.
USPC ............ 709/203; 709/207; 713/164; 713/167

(58) Field of Classification Search
USPC .......................................................... 709/203
See application file for complete search history.

(56) References Cited

U.S. PATENT DOCUMENTS

| 5,249,291 | A | 9/1993 | Williams | |
| 5,969,705 | A * | 10/1999 | Fisher et al. ................... | 715/764 |
| 6,230,160 | B1 | 5/2001 | Chan et al. | |
| 7,587,594 | B1 * | 9/2009 | Kavalam et al. .............. | 713/167 |
| 2003/0069923 | A1 * | 4/2003 | Peart ............................ | 709/203 |
| 2003/0069924 | A1 * | 4/2003 | Peart et al. .................... | 709/203 |
| 2003/0074393 | A1 * | 4/2003 | Peart ............................ | 709/203 |
| 2004/0111730 | A1 | 6/2004 | Apte | |
| 2004/0243644 | A1 | 12/2004 | Steere et al. | |
| 2006/0075408 | A1 | 4/2006 | Powers et al. | |
| 2006/0148741 | A1 * | 7/2006 | Barrett et al. .................... | 514/44 |
| 2006/0149741 | A1 * | 7/2006 | Krishnamoorthy ............. | 707/10 |
| 2006/0167974 | A1 | 7/2006 | Shalabi et al. | |
| 2007/0083875 | A1 | 4/2007 | Jennings | |
| 2007/0150303 | A1 | 6/2007 | Cheenath | |
| 2007/0150546 | A1 * | 6/2007 | Karakashian et al. ........ | 709/207 |
| 2008/0034208 | A1 * | 2/2008 | Mantere et al. ............... | 713/164 |

OTHER PUBLICATIONS

Goldszmidt, et al., "Distributed Management by Delegation" , 1995, IEEE , pp. 333-340.
Goldszmidt , et al., "Delegated Agents for Network Management" , IEEE Communications Magazine , Mar. 1998 , IEEE, 1998, pp. 66-70.
Pawlowski, et al., "The NFS Version 4 Protocol" , Proceedings of the 2nd international system administration and networking conference (SANE2000), 2000, pp. 1-20.

* cited by examiner

*Primary Examiner* — Hamza Algibhah
*Assistant Examiner* — Natisha Cox
(74) *Attorney, Agent, or Firm* — Henry Gabryjelski; Kate Drakos; Micky Minhas (57) ABSTRACT

Aspects of the subject matter described herein relate to delegating application invocation back to a client. In aspects, a server hosts an application that has a user interface that is presented on a client. User interaction on the user interface is encoded and sent to the server to give to the application. When the user uses the application such that another application is to be executed, a server delegator determines whether to execute the other application on the server or the client. If the application is to be executed on the client, the server delegator instructs a component that executes on the client to execute the application on the client. Otherwise, the application is executed on the server and data representing the user interface of the application is sent to the client so that the client may present the user interface to a user.

14 Claims, 5 Drawing Sheets

DELEGATING APPLICATION INVOCATION BACK TO CLIENT

BACKGROUND

An application that physically executes on a server may have a user interface that is viewed on a client. When a user interacts with the user interface on the client, data regarding the interaction may be sent to the server for processing. The server may then present the data to the application. The application may respond to the data and change the user interface as appropriate. The updated user interface may then be sent to the client for display. This interaction may be transparent to the user such that the remote application appears much like a local application.

Through the interaction above, the remote application may execute another application on the server. For example, the user may select a hyperlink that causes a browser to be launched on the server. For security and other reasons, this type of behavior may be undesirable.

SUMMARY

Briefly, aspects of the subject matter described herein relate to delegating application invocation back to a client. In aspects, a server hosts an application that has a user interface that is presented on a client. User interaction on the user interface is encoded and sent to the server to give to the application. When the user uses the application such that another application is to be executed, a server delegator determines whether to execute the other application on the server or the client. If the application is to be executed on the client, the server delegator instructs a component that executes on the client to execute the application on the client. Otherwise, the application is executed on the server and data representing the user interface of the application is sent to the client so that the client may present the user interface to a user.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
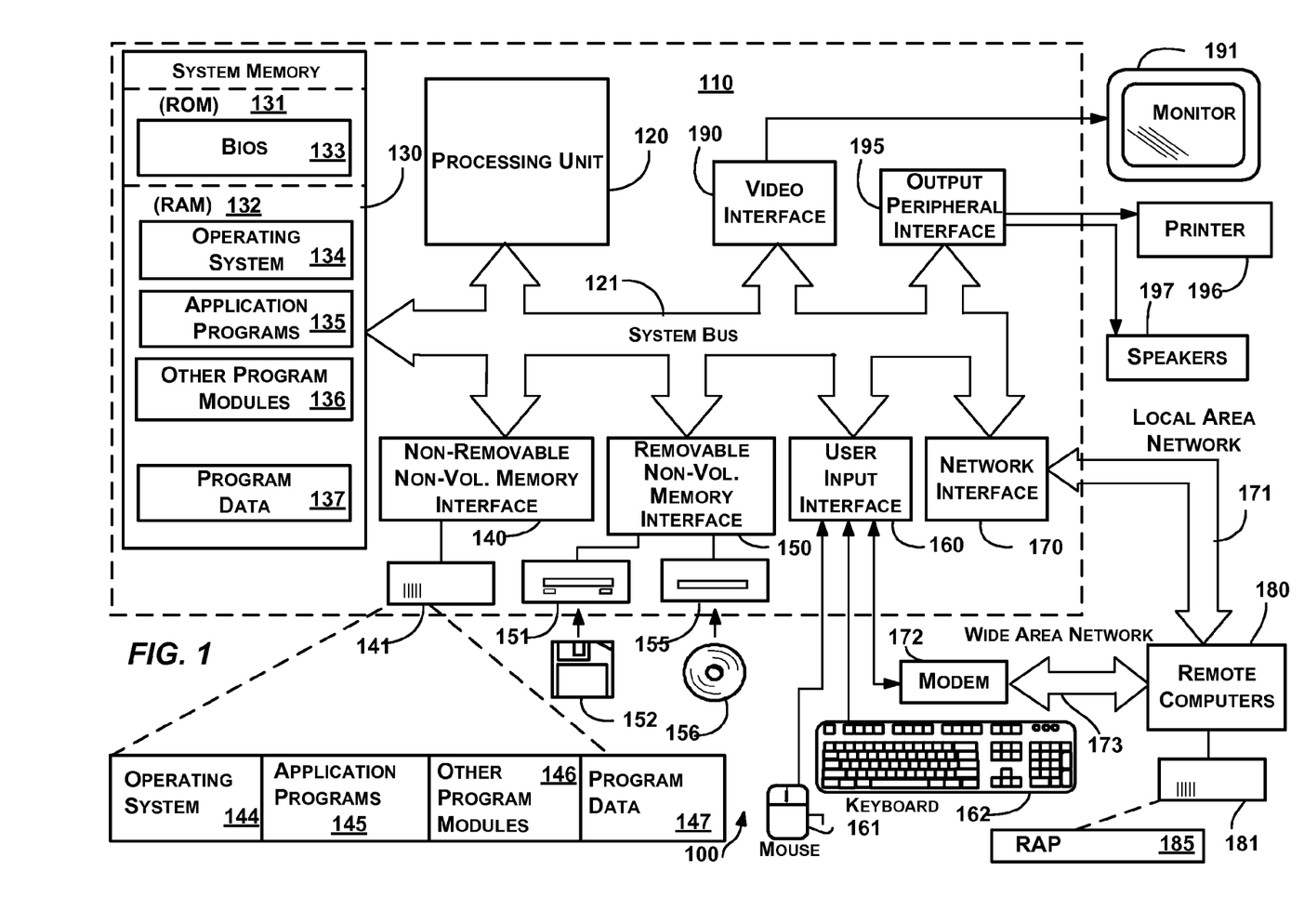
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Invoking Application on Client

As mentioned previously, the user interface of an application that physically executes on a server may be viewed on a client. In interacting with this interface, the user may cause another application to be launched on the server. This type of behavior may be undesirable.

For example, if in interacting with the interface, the user selects a hyperlink, this may cause a browser to be launched on the server. Executing the browser on the server may expose the server to software from malicious sites or may cause denial of service if the server prevents out-going HTTP traffic.

As another example, the user may select to open a document (e.g., a text document). Launching an application (e.g., a word processor) on the server to view the document may use server resources and increase latency.

As another example, there may be high latency between a server and a client. In this case, the responsiveness of a user interface may be frustrating for a user to deal with.

It is not intended to limit aspects of the subject matter described herein to the examples described above. Indeed, those of skill in the art will recognize many other examples of situations in which launching an application on the server may be undesirable. The teachings described herein may also be applied in these situations without departing from the spirit or scope of aspects of the subject matter described herein.

In accordance with aspects of the subject matter described herein, when interaction with the user interface would cause another application to be executed, a component is executed that determines whether to execute the other application on the server or the client. If the application is to be executed on the server, the component causes the application to be executed on the server; otherwise, the component instructs the client to execute the application and provides appropriate parameters.

Figure 2:
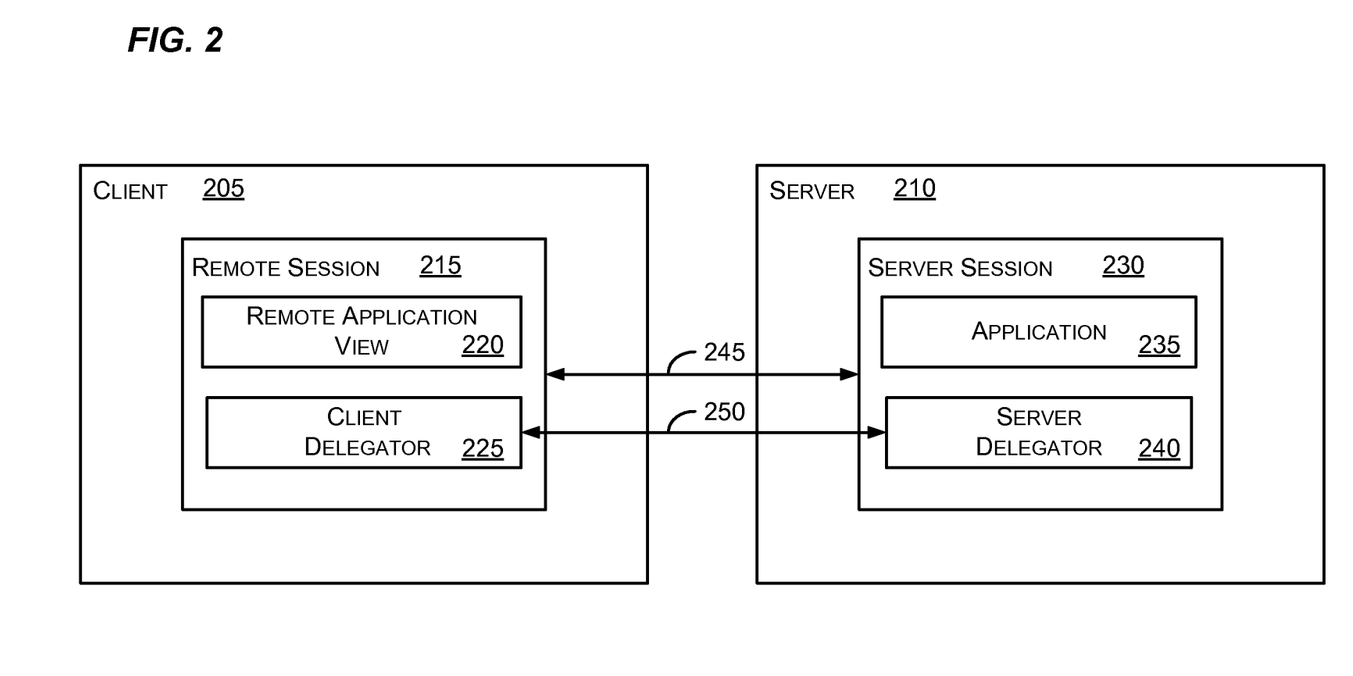
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a client 205 and a server 210, which each include various entities, and may include other entities (not shown).

Where a line (e.g., the lines 245 and 250) connects one entity to another, it is to be understood that the two entities may be connected (e.g., logically, physically, virtual, or otherwise) via any type of network including a direct connection, a local network, a non-local network, the Internet, some combination of the above, and the like. In one embodiment, the line 250 represents a virtual connection that is established over the connection represented by the line 245. In this embodiment, there may be one or more network connection between the remote session 215 and the server session 230 which may be used for communications between two sets of entities (e.g., between the remote session 215 and the server session 230 and between the client delegator 225 and the server delegator 240). In another embodiment, the line 250 represents a separate connection from connection represented by the line 245.

The client 205 and the server 210 may be implemented on or as one or more computers (e.g., the computer 110 as described in conjunction with FIG. 1). Although the terms "client" and "server" are used, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, the client 205 and the server 210 may both be peers, servers, or clients.

To support application sharing between the client 205 and the server 210, the client may instantiate a remote session 215 while the server may instantiate a server session 230. The sessions 215 and 230 may comprises objects that communicate and maintain information about applications (e.g., one of which may be application 235) executing on the server 210. The remote application view 220 presents user interfaces of application executing on the server 210 and to interact with the user interfaces.

The remote application view 220 may present the user interface of an application executing on the server such that, from the user's perspective, it appears that the application is executing on the client 205. For example, the user may be able to resize the user interface, minimize it, maximize it, close it, and so forth just like the user resizes, minimizes, maximizes, and closes applications that execute on the client 205. The remote application view 220 may capture user interaction with a user interface presented by the remote application view 220 and may process this interaction into data that is then sent to the server session 230. The server session 230 may then forward this data to the corresponding application (e.g., application 235) on the server 210.

When, in interacting with a user interface, the user performs an action that would cause another application to execute, the server delegator 240 may be called to determine whether to execute the application on the server 210 or the client 205. One mechanism that may be used to call the server delegator 240 is to have the server delegator 240 register with the operating system to be the default application that is called when a particular request is received. For example, the server delegator 240 may register as the default browser. When the server receives a request to launch a browser, the server may then call the server delegator 240.

Another mechanism that may be used is to have the server delegator 240 monitor requests to launch applications. In this mechanism, the server delegator 240 may be configured such that it is able to see each new request to launch an application before the request reaches the operating system of the server 210. If the server delegator 240 determines that the application is to be executed on the server, the server delegator 240 may pass the request to the operating system. Otherwise, the server delegator 240 may instruct the client delegator 225 to execute an application on the client 205.

To make a determination as to whether the client or the server is to execute an application, the server delegator 240 may use logic that is created by a system administrator, programmer, end user, or the like. This logic may vary from implementation to implementation and may be adapted for the preference of the organization or individual. For example, if the client 205 and the server 210 are connected by a connection that has significant latencies, the logic may dictate to execute the application on the client 205 whenever possible. As another example, if the client 205 has a version of the application that is to be launched, but the version is not identical to the version on the server 210, the logic may be used to determine if the versions are close enough for the application to be executed on the client 205. Based on the teachings herein, those skilled in the art will recognize many other examples of logic that may be employed without departing from the spirit or scope of aspects of the subject matter described herein.

In one embodiment, when the server delegator 240 determines that an application is to be executed on the server 210, the server delegator 240 may call code on the server 210 to execute the application. If the server delegator 240 determines that an application is to be executed on the client 205, the server delegator 240 may instruct the client delegator 225 to execute the application.

Note that the application that would be executed on the server may be different than the application that would be executed on the client. For example, when the user clicks on a link that would launch an e-mail application, if the application is to execute on the server, then a corporate e-mail application may be launched. If the application is to execute on the client, a personal e-mail application may be launched. As another example, if the user clicks on a link that would launch an Internet browser, if the browser is to execute on the server, a corporate default browser may be used. If the browser is to execute on the client, the default browser of the client may be used.

In conjunction with instructing the client delegator 225 to execute the application, the server delegator 240 may send translated parameters associated with the application execution to the client delegator 225. For example, if the application is opening a document on the server 210, the server delegator 240 may translate the address of the server from a local address to a universal naming convention (UNC) address. For example, the document may have an address of D:\Data\Documents\Document.doc on the server 210. This address, however, may not be viewable to entities outside of the server 210. To allow a remote entity to access the document, the server delegator 240 may translate the address of D:\Data\Documents\Document.doc to \\server\path\document.doc. This translated address may then be sent to the client delegator 225. The client delegator 225 may then pass this address to the application it launches so that the application is able to locate the document.

In one embodiment, the protocol used to communicate between the client 205 and the server 210 is a well-established protocol such as the remote desktop protocol (RDP). In other embodiments, however, other protocols may be used without departing from the spirit or scope of aspects of the subject matter described herein.

Figure 3:
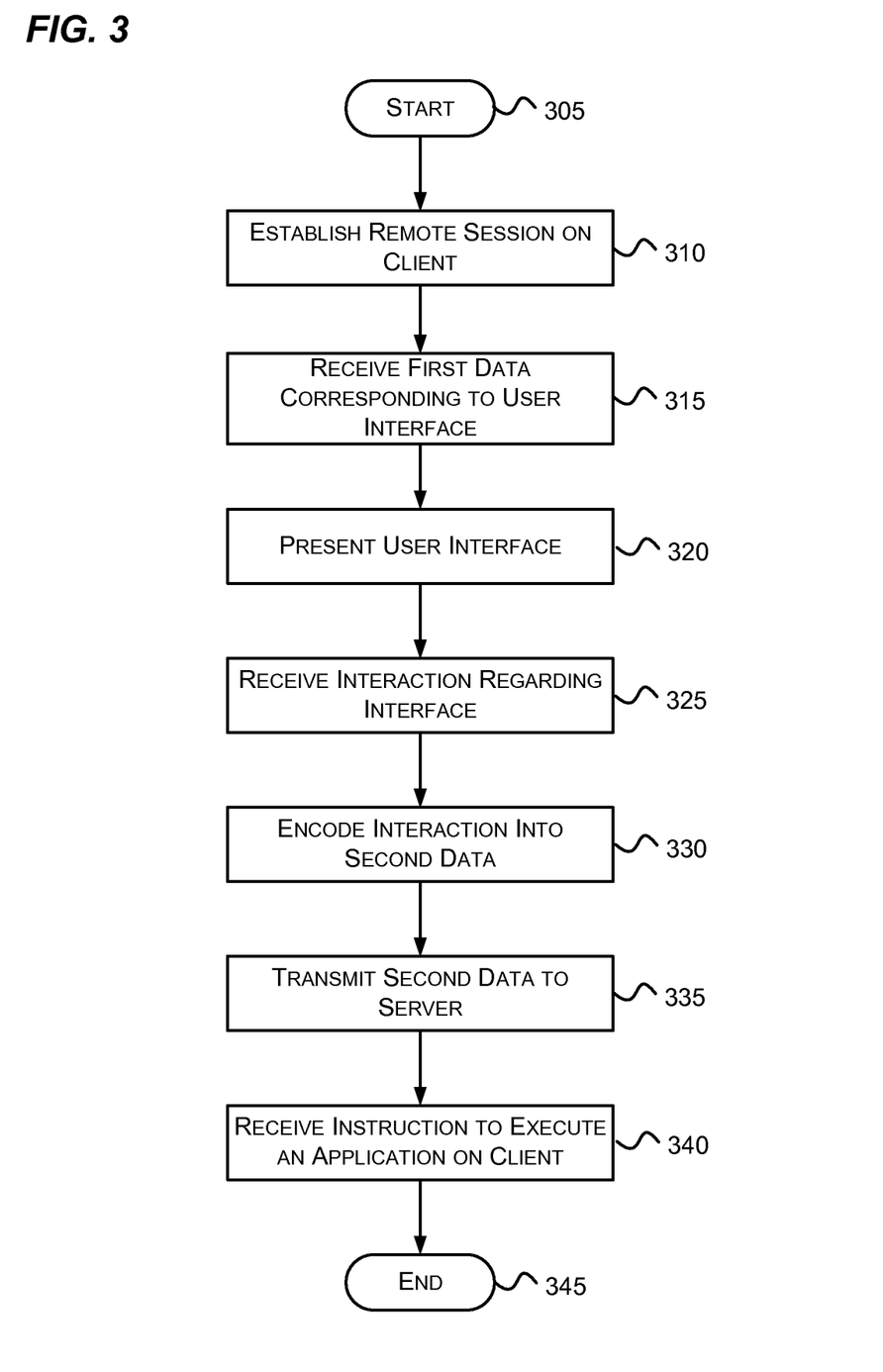
FIGS. 3-4 are flow diagrams that generally represent exemplary actions that may occur on a client and a server in accordance with aspects of the subject matter described herein.
Figure 4:
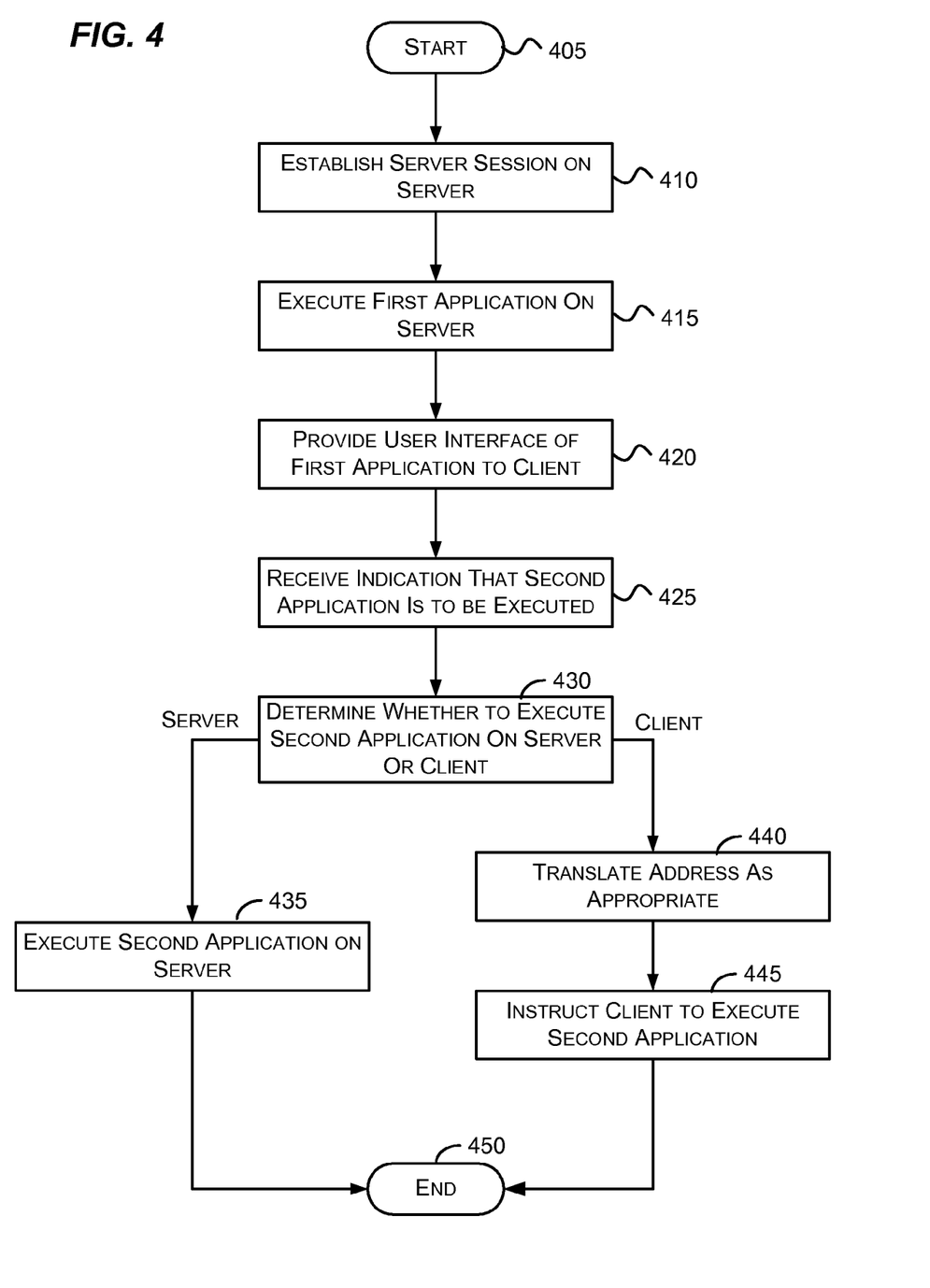

FIGS. 3-4 are flow diagrams that generally represent exemplary actions that may occur on a client and a server in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin. At block 310, a remote session is established on a client. For example, referring to FIG. 2, the remote session 215 is established on the client 205. This remote session 215 may then be connected to the server session 230.

At block 315, data corresponding to a user interface of an application that is executing on a server is received. For example, referring to FIG. 2, the remote session 215 may receive data corresponding to the user interface of the application 235 of the server session 230.

At block 320, this data is used to present a user interface on the client. For example, referring to FIG. 2, the remote application view 220 uses the data to present (e.g., display) a user interface of the application 235.

At block 325, an interaction regarding the interface is received. This interaction may indicate that another application is to be executed. For example, referring to FIG. 2, the remote application view 220 may receive a user interaction that indicates that an Internet browser is to be executed.

At block 330, the interaction is encoded into data suitable for transmission to the server. This encoding may take many forms including indicating what control was activated, deactivated, or so forth, providing coordinates and an indication of the interaction (e.g., a mouse click), providing an indication of an event corresponding to the interaction, and so forth.

At block 335, the data is transmitted to the server. For example, referring to FIG. 2, the remote session 215 sends the data to the server session 230 to present to the application 235.

At block 340, an instruction is received to execute an application on the client. For example, referring to FIG. 2, the client delegator 225 receives an instruction to execute an Internet browser on the client 205. In conjunction with receiving the instruction, the client delegator 225 may also receive an address (e.g., an URL) of a resource to provide to the Internet browser.

Note that if the server delegator determines that the server is to execute the application, the actions associated with block 340 may be skipped.

At block 345, the actions end.

Turning to FIG. 4, at block 405, the actions begin. At block 410, a server session is established on a server. For example, referring to FIG. 2, For example, referring to FIG. 2, the server session 230 is established on the server 210. This server session 230 may then be connected to the remote session 215.

At block 415, an application associated with the server session 230 is executed on the server. For example, referring to FIG. 2, the application 235 is executed on the server 210.

At block 420, data corresponding to the user interface of the application is provided to a client. For example, referring to FIG. 2, the server session 230 provides data corresponding to the user interface of the application 235 to the remote session 215. The remote session 215 may then display this data using the remote application view 220.

At block 425, an indication is received that another application is to be executed. For example, referring to FIG. 210, the server session 230 receives data from the remote session 215 that indicates that an Internet browser is to be executed.

At block 430, a determination is made as to whether to execute the application on the server or the client. For example, referring to FIG. 2, the server delegator 240 determines whether the Internet browser is to be executed on the client or the server. As described previously, the server delegator 240 may use logic that may vary from implementation to implementation to make this determination.

If the application is to be executed on the server, at block 435, the application is executed on the server. For example, referring to FIG. 2, the server delegator 240 causes the application to be launched on the server 210. The server session 230 may then send data corresponding to the newly launched application to the remote session 215 for viewing on the client 205.

If the application is to be executed on the client, at block 440, the address associated with the application, if any, is translated as appropriate. For example, if the address is to a file local to the server, the address is translated to an address that can be accessed via the client. Note that some applications may not need an address and that some addresses may not need to be translated.

At block 445, the client is instructed to execute the application on the client. For example, referring to FIG. 2, the client delegator 225 is instructed to execute the application on the client 205.

At block 450, the actions end.

Figure 5:
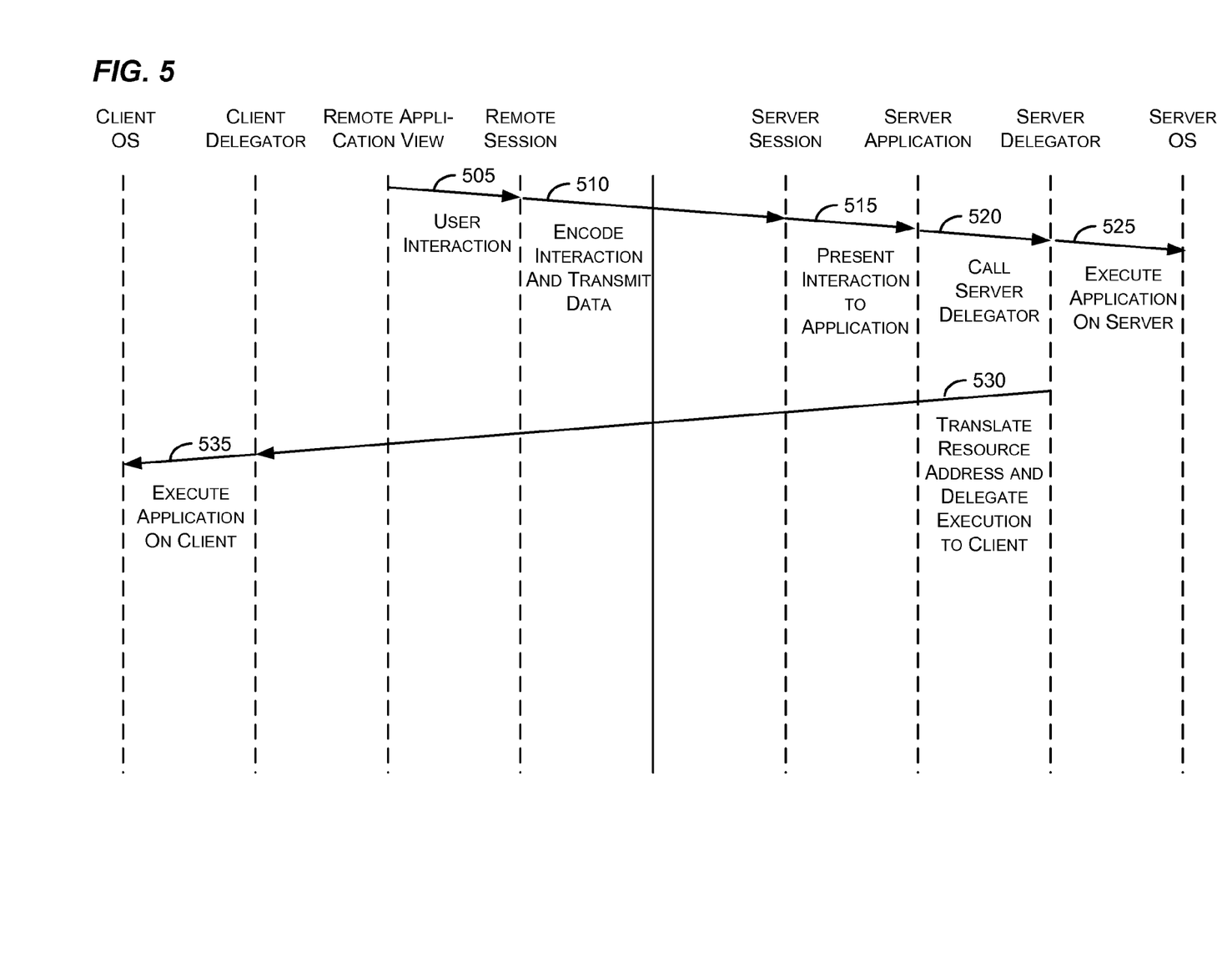
FIG. 5 is an exemplary timing diagram that illustrates a sequence of events that may occur in executing another application in accordance with aspects of the subject matter described herein.

FIG. 5 is an exemplary timing diagram that illustrates a sequence of events that may occur in executing another application in accordance with aspects of the subject matter described herein. At 505, the remote application view receives a user interaction associated with a user interface of an application that executes on a server.

At 510, the interaction is encoded and sent as data to a server session. At 515, the server session receives the data, decodes it, and sends the decoded data to the server application. At 520, the server application determines that another application is to be executed. In response, the server delegator is called to determine whether to execute the application on the server or on the client.

At 525, if it is determined that the application is to be executed on the server, the server OS is called to execute the application. At 530, if it is determined that the application is to be executed on the client, the address, if any, associated with the resource is translated as appropriate and an instruction is sent to the client delegator to execute the application on the client. At 535, the client delegator receives the instruction and instructs the client OS to execute the application. Note that for any specific user interaction 505 either the actions associated with 525 or the actions associated with 530 and 535 are performed, but that not both set of actions are performed for one user interaction 505.

As can be seen from the foregoing detailed description, aspects have been described related to delegating application invocation back to a client. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage memory having computer-executable instructions, which when executed perform actions, comprising:
    registering a server delegator with an operating system of the server to be a default application that is called when a request to execute a second application is received;
    receiving, at a server, an indication that the second application is to be executed, the server hosting a first application that has a first user interface that is provided to a client, the indication being generated in conjunction with interaction, on the client, with the first user interface;
    determining by the server delegator, at the server, whether to execute the second application on the server or the client;
    if the second application is to be executed on the server, executing the application on the server and providing a second user interface corresponding to the second application to the client; and
    if the second application is to be executed on the client, instructing a client delegator executing on the client to execute a third application, translating an address of a resource used by the second application from a local address to a universal naming convention (UNC) address and sending the address as translated to the client delegator in conjunction with instructing the client delegator to execute the third application, wherein the third application is a different application than the second application.

2. The computer storage memory of claim 1, wherein the indication comprises an event associated with the first user interface.

3. The computer storage memory of claim 1, wherein determining whether to execute the second application on the server or the client comprises evaluating logic.

4. The computer storage memory of claim 1, wherein receiving, at a server, an indication that a second application is to be executed comprises receiving the indication via a remote desktop protocol that specifies a protocol for sending data corresponding to the first user interface to the client and a protocol for sending interaction data regarding the first user interface from the client to the server.

5. The computer storage memory of claim 1, wherein receiving, at a server, an indication that a second application is to be executed comprises executing the program by the server in response to a data received from the client, the data encoding an interaction with the first user interface.

6. The computer storage memory of claim 1, wherein receiving, at a server, an indication that a second application is to be executed comprises intercepting a request that is directed to an operating system of the server, the request including the indication that the second application is to be executed.

7. A method implemented at least in part by a computer, the method comprising:
    receiving, at a client, first data corresponding to a user interface of an application that is executing on a server;
    presenting the user interface on the client;
    receiving an interaction with the user interface, the interaction indicating that a second application is to be executed;
    encoding the interaction into second data suitable for transmission to the server;
    transmitting the second data to the server;
    intercepting by a server delegator the second data that is directed to an operating system of the server, the second data including the indication that the second application is to be executed;
    determining by the server delegator, at the server, whether to execute the second application on the server or the client based upon whether or not the second application is an Internet browser, wherein if the second application is an Internet browser, the server delegator delegating execution of the second application to the client; and
    if the second application is to be executed on the client, receiving an instruction from the server to execute a third application on the client and receiving an address of a resource used by the second application translated from a local address to a universal naming convention (UNC) address, wherein the third application is a different application than the second application.

8. The method of claim 7, wherein presenting the user interface on the client comprises presenting the user interface is a similar manner as user interfaces associated with applications executing on the client are presented.

9. The method of claim 7, further comprising receiving information from the server that indicates a resource for the third application to use upon execution.

10. The method of claim 9, wherein the information is received in conjunction with receiving the instruction from the server to execute the third application on the client.

11. The method of claim 9, wherein the information comprises an address at which the resource is available.

12. The method of claim 9, wherein the information is derived from an address at which the resource is available to an application on the server.

13. The method of claim 7, further comprising presenting an other user interface corresponding to the third application together with the user interface of the application that is executing on the server.

14. In a computing environment, an apparatus, comprising:
    a server session operable to maintain state regarding a first application that executes on a server hosted on the apparatus, the first application having a user interface that is provided to a remote session connected to the server session for presentation on a remote device; and
    a server delegator operable to register with an operating system of the server to be a default application that is called when a request to execute a second application is received, the server delegator further operable to receive an indication that a second application is to be executed and to determine whether to execute the second application on the server or the remote device, wherein the server delegator is further operable to instruct the remote session to execute a third application when the server delegator determines that the remote device is to execute the second application, translate an address of a resource used by the second application from a local address to a universal naming convention (UNC) address and send the address as translated to the remote session in conjunction with instructing the remote session to execute the third application, wherein the third application is a different application than the second application.

* * * * *